Figure 1:
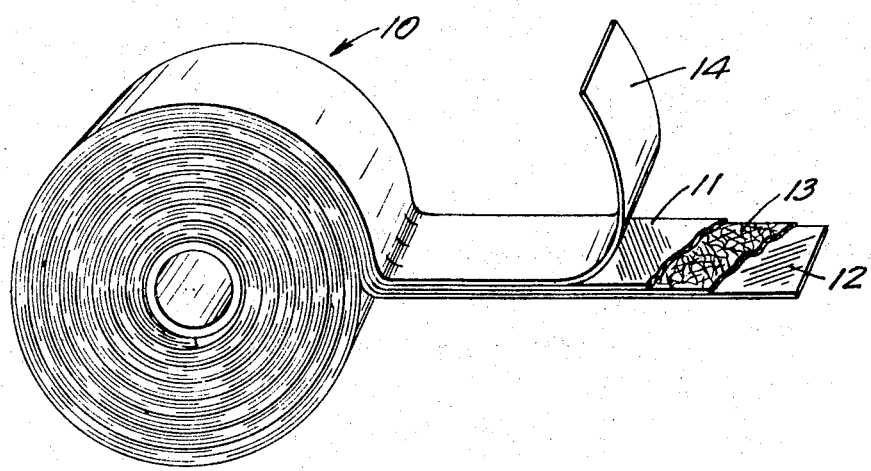

May 11, 1965  H. J. TIERNEY  3,183,142
REINFORCED RESINOUS STRUCTURAL MATERIAL
Filed April 9, 1962

INVENTOR
HUBERT J. TIERNEY
BY
Carpenter, Abbott, Coulter & Kinney
ATTORNEYS

United States Patent Office 3,183,142
Patented May 11, 1965

3,183,142
REINFORCED RESINOUS STRUCTURAL MATERIAL
Hubert J. Tierney, Dellwood, Minn., assignor to Minnesota Mining & Manufacturing Company, St. Paul, Minn., a corporation of Delaware
Filed Apr. 9, 1962, Ser. No. 188,297
9 Claims. (Cl. 161—58)

This invention relates to thin, strong, extensible, contortable resinous tape which is bi-directionally reinforced with flexible, high-strength, non-woven, aligned, essentially contiguous filaments and takes a narrow, continuous, splice-free form adapted to be wound upon itself as a roll for convenient storage and shipment.

This application is a continuation-in-part of my co-pending application Serial No. 697,934, filed November 21, 1957, now abandoned.

Reinforced resinous sheet material has recently attained considerable commercial stature. Its light weight, impact resistance, high strength, and good resistance to weathering and to the action of chemicals admirably fits the material for use in fabricating boats, aircraft, missiles, radio cabinets, automobile bodies, chemically-resistant pipe of high bursting strength, structural beams and trusses, wall panels and the like. For such uses, non-reinforced resin compositions lack strength and durability.

Used almost exclusively as the primary reinforcing element for resinous sheet material is fibrous glass. Heretofore, some resinous sheets and strip material employing fibrous glass reinforcement have been made with a degree of pliability and stretchability. For example, Modigliani Patent No. 2,609,320 shows a stretchable fabric of fibrous glass arranged bi-directionally in two or more layers having resin at the crossing points of the filaments. Since the filaments are free to bend between the adhesively locked crossing points, such fabric is highly conformable; but after being applied, resin must be added to fill the spaces between the filament crossing points so that the proportion of resin to reinforcement is uncontrolled. Furthermore, such fabric tends to stretch unevenly with resultant haphazard distribution of reinforcement. With such non-uniformity, shrinkage on curing is uneven and may result in rippled or irregular surfaces. For certain important uses, uniformity of structure is required regardless of other considerations. For example, a radome must transmit radiation uniformly over its entire area to provide a true return.

Loosely woven glass fabric impregnated with uncured thermosetting resin is stretchable in two directions, but its conformability is limited and the cured products have significant deficiencies. For example, the warp and fill threads tend to abrade and weaken each other, particularly when the fabric is stretched, and looseness of weave results in a finished product which comprises a great deal more resin than glass and consequently possesses less strength for a given cross-section than does a comparable sheet densely filled with glass filaments. The cloth must be cut on the bias for lengthwise stretchability and so is not available without splices in desirably long lengths. Usually resin is not applied until after the cloth is laid in place since it is so difficult to pull bias fabric through a coater without dis-orienting the fibers.

The present invention provides thin, strong, conformable reinforced resinous tape adapted to be wound for storage and shipment in roll form in splice-free lengths of 100 feet or more. Briefly, the novel stretchable tape comprises at least two coterminous layers of flexible, high-strength, non-woven, aligned, essentially contiguous filaments or other strand material, which filaments are uniformly distributed within each such layer and are saturated and unified by a deformable, uncured thermosetting resin composition. These filaments extend obliquely and oppositely and essentially at only two angles, each of said angles being not more than about 60 degrees to the longitudinal direction of the tape. Selection of filament orientation is limited by the maximum required elongation, which should normally be thirty percent or more. This theoretically requires that the filaments be disposed at no less than about 40 degrees with the longitudinal direction of the tape; but in actual practice, a tape of filament angles of 30 degrees to the longitudinal and even less can normally be elongated more than thirty percent without breaking.

While the filaments are normally disposed symmetrically at an angle of about 30–60 degrees with the longitudinal direction of the tape and the number of filaments in one layer equals that of the next layer, an unsymmetrical orientation or unequal filament distribution between layers may be desired for specific applications, as where added strength is required in a particular dimension of an object to be wrapped.

In order to attain maximum strength and optimum handleability, the filaments are essentially contiguous, and each layer of filaments normally comprises more than fifty percent by weight of filamentary material, particularly when using a relatively dense filament such as glass, which is a preferred reinforcing material because of its good flexibility, low cost, extraordinary tensile strength and chemical resistance. Where the filaments are glass or of the density of glass, the filaments may comprise from 40 to 80% by weight of each layer; but at over 65% glass, there should be a stress-absorbing layer interposed between adjacent layers of aligned filaments. A layer of thermosetting resin having a uniform thickness of 1 to 20 mils may be employed for this purpose, and a 2.5-mil layer of pressure-sensitive adhesive has demonstrated good utility. Preferably the thickness of the stress-absorbing layer is about 1 to 5 mils.

Even where the glass: resin ratio is less than 65:35, a stress-absorbing layer improves the stretchability of the uncured tape, and an especially useful stress-absorbing layer is provided by a conformable non-woven resin impregnated fabric of randomly intermingled polyethylene terephthalate fibers or other strong, non-hygroscopic fibrous matter. The fabric may be prepared from approximately equal amounts of drawn and undrawn polyethylene terephthalate fibers by pressing a loose heterogeneous fluffy web of short interlaced fibers at a temperature sufficient to cause fusing of the undrawn fibers but under a pressure light enough to prevent the unsoftened drawn fibers from cutting into the undrawn fibers. Consequently, the two types of fibers are superficially bonded together, if at all, and the drawn fibers are not interbonded to each other and can slide over each other at their crossing points. Any deviation from the random arrangement of the fibers will lend directionality to the tensile and elongation properties of the fabric.

Another particularly suitable resin impregnated fabric to employ in the stress-distributing layer is highly porous papers comprising about 70 to 80% drawn polyethylene terephthalate fibers of ¼-inch length and 1.5 denier and 20 to 30% polyethylene terephthalate fibrids which has been fused at about 400° F. Such paper is highly conformable and is especially desirable because it possesses good strength in thicknesses of only one to 3 mils (about 5 to 15 pounds per 500-sheet ream, 24 by 36 inches).

The caliper thickness of each layer of aligned, resin-impregnated filaments preferably approximates 5 to 10 mils, and tapes made with layers of much thicker caliper, e.g., more than about 20 mils, have less flexibility and conformability than is desired. On the other hand, it is difficult to prepare a sheet of aligned, resin-saturated filaments less than about 4 mils in thickness.

The uncured thermosetting resin composition by which the filaments are bonded into unitary layers preferably has sufficient elasticity to allow a measure of recovery from a stretched condition. Normally, the resin composition is somewhat tacky at ambient temperatures, or the stretchable tape product is provided with a thin tacky surface coating to enable the tape to adhere to hard, smooth surfaces and to preceding wraps to a satisfactory extent. It is sufficient for most purposes that the tape surface develop a degree of tackiness when warmed, and some uses require no stickiness whatsoever.

The resin composition should also be selected so that the uncured tape is resistant to materials with which it may come into contact prior to curing, and to provide a cured product of specified quality, e.g., superior electrical or heat insulating properties or resistance to corrosive attack. Especially useful are silicone resins, phenol-formaldehyde resins or epoxy resins, and those resin compositions which are virtually stable at room temperatures but which cure rapidly at moderately elevated temperatures are particularly preferred. Hardening agents which form stable thermosetting compositions with epoxy resin include N,N-diallylmelamine, isophthalyl dihydrazide, dicyandiamide, and mixtures of these. However, the use of non-storable compositions is not precluded if the sheet material is intended for use shortly after fabrication.

While the novel conformable reinforced resinous tape provides highly useful products from only two layers of resin-impregnated, lineally-aligned filaments as described above, additional filament layers may sometimes be desirable, as long as the filaments of each such layer are essentially parallel to filaments one layer removed. The novel tape may also include very thin organic films, if of such thinness that the stretchability of the uncured tape is substantially not impaired. Since wrinkling greatly increases shear forces within the tape on stretching, the film should have little tendency to wrinkle when stretched. Fibrous coverings may be provided by a sprinkling of randomly oriented floccules such as polytetrafluoroethylene ("Teflon") or nylon floc or chopped asbestos fibers. Upon curing with heat, the resin composition flows into the previously non-saturated fibrous material to provide a tough, monolithic structure of good appearance.

A surface sheet can function as a self-contained liner, enabling the tape to be wound in roll form without the use of a separate, disposable liner as would normally be required. For improved ease in unwinding, the surface sheet may be provided with a low-adhesion backsize coating, as may a primer coating be used on its inner surface for improved bonding to the resin composition.

The bi-directionally reinforced resinous tapes of this invention in widths of less than about 3/8 inch normally lack sufficient strength for good handleability. However, by selecting a resin which is elastic in the uncured state and which preferably can in such state and without reinforcement provide a thin, self-sustaining, rubbery film of good tensile strength, tape of somewhat narrower width can have good handling characteristics. At widths greater than about two or three inches, it is ordinarily difficult to elongate the tape by hand to the desired extent, and the edges of the tape have a tendency to roll— making application to a surface more difficult.

At widths of about 3/8 to 3 inches, the novel stretchable tape normally has excellent handling qualities and lends itself to easy application to compond shapes to provide smooth protective sheaths of good appearance.

The stretchable reinforced resinous tape of this invention is conveniently fabricated from pre-formed sheets or tapes of non-woven, lineally-aligned filaments saturated and unified with thermosetting resin composition, whereby the filaments are maintained in parallel and essentially contiguous relationship. By way of example, glass-filament-reinforced resinous sheets have been produced by passing through a heated bath of resin a web of lineally-aligned continuous glass filaments, e.g., 130 ends per inch width of "Fiberglas" filaments, each end containing 204 filaments, each of about 0.00038 inch diameter. (Glass filaments of about 0.00015 to 0.0006 inch diameter may be used.)

Fabrication of the novel conformable resinous tapes using such resinous sheets of lineally-aligned filaments is conveniently accomplished by conventional tube-forming techniques using a cylindrical mandrel. By way of example, a low-adhesion carrier sheet may be wrapped longitudinally around and advanced along the mandrel, and over this may be spirally and oppositely wrapped a pair of the resinous sheets of lineally-aligned filaments. As the tubular object thus formed advances off the mandrel, it is slit longitudinally into one or more tapes which are then wound into roll form for storage or shipment. Alternatively, the sheets of nonwoven, lineally-aligned filaments need not be pre-impregnated but can be unified with a thermosetting resin composition during the wrapping process.

Figure 2:
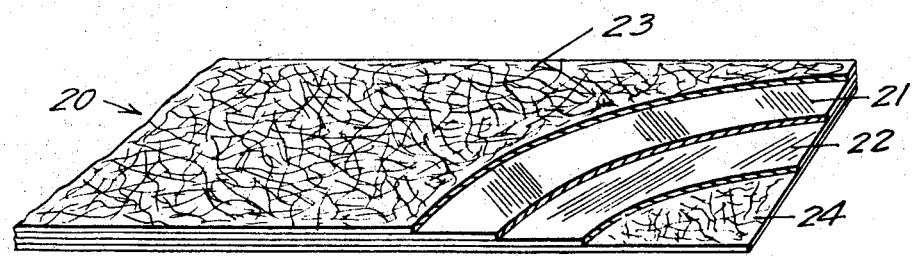

The structure of conformable, bi-directionally reinforced resinous tapes of this invention is illustrated in the accompanying drawing in which:

FIG. 1 shows by a diagrammatic perspective view a roll of stretchable resinous tape of the invention, partly broken away to illustrate the structure, and showing the low-adhesion carrier web, on which the tape may be formed, being stripped away to allow the tape to be applied to an intended end use; and FIG. 2 is a fragmentary perspective view of another preferred conformable resinous tape of the invention.

Referring to the roll of tape 10 illustrated in FIG. 1, two layers 11 and 12 of flexible, high-strength, non-woven, aligned filaments such as glass unified with a thermosetting resin composition are laid up with filaments disposed oppositely, those of layer 11 at an angle of about 60 degrees with the longitudinal direction of the tape 10 and those of layer 12 at an angle of about 30 degrees to the longitudinal. Adhered between the layers 11 and 12 is a non-woven mat 13 of mixed drawn and undrawn polyethylene terephthalate fibers saturated with the resin composition of layers 11 and 12. The layer 11 is also adhered to a low-adhesion carrier web 14 whereby the tape 10 is adapted for use in roll form as shown. Prior to application of the stretchable tape to its intended use, the carrier web 14 is stripped away as shown in FIG. 1 and then cut off and discarded.

The bi-directionally reinforced resinous tape 20 shown in FIG. 2 includes two layers 21 and 22 of aligned glass filaments unified with and adhered to each other by a thermosetting resin. The filaments of each of layers 21 and 22 are oriented at an angle of 45 degrees to the longitudinal direction of the tape 20 and oppositely with respect to those of the other layer. Adhered to the opposite surfaces of layers 21 and 22 are non-woven mats 23 and 24, respectively, of randomly intermingled drawn and undrawn polyethylene terephthalate fibers.

The tape structure of FIG. 2 is conveniently prepared by first superficially interbonding the two layers of the polyethylene terephthalate mat 23 and 24 by pressing them together lightly when heated just to the softening point of the undrawn fibers. Then the two symmetrically arranged layers 21 and 22 of resin-impregnated lineally aligned filaments are adhered to one surface of the duplex mat and the whole is wound into roll form. Assuming the impregnating resin of layers 21 and 22 is tacky at ambient temperatures, the duplex mat layers 23 and 24 split upon unwinding due to the preferential adherence of the mats to the resin, whereby the structure of FIG. 2 is attained. Apart from small amounts of resin which work into the mat layers from the filament layers, each mat is free from resin. However, when the structure is heat-cured after being applied under tension to an intended use as by being tightly wrapped around an electrical coil, resin flows into the mats from the filament layers to provide a monolithic cured structure having a tough, resinous exterior of good appearance.

The following typical examples will serve more fully to describe the invention and should not be construed in a limiting sense.

Example I

Reinforced resinous sheet material was formed by drawing through a heated bath of epoxy resin and hardener a large number of lineally-aligned, continuous, lightly-twisted glass filaments, viz., 195–200 ends per inch of glass roving, i.e., 140's, vinyl silane size. The epoxy resin was a condensation product of epichlorhydrin and bisphenol A, and had a softening point of about 30° C. as determined by the Durrans' Mercury Method. Admixed therewith was a hardener consisting essentially of adipyl dihydrazide to provide a stable, heat-curable composition which adheres well to glass, both before and after curing in contact therewith. The sheet, which had a caliper thickness of about 10 mils and comprised about 35 percent resin by weight, was then joined with a low-adhesion carrier web and the whole was slit longitudinally to suitable widths and wound into roll form for storage.

A conformable, bi-directionally reinforced resinous tape was made by angularly cutting strips from the storage rolls into appropriate lengths and laying segments in edge-to-edge relationship on a low-adhesion carrier tape (corresponding to layer 14 of FIG. 1) with the filaments disposed at an angle of 60 degrees with the lengthwise direction of the carrier tape to form a first filament layer (corresponding to layer 11 of FIG. 1). The resin impregnant had sufficient tackiness to hold each segment in position on the carrier tape while the corresponding segment of the original carrier web was stripped away. A continuous, non-woven polyethylene terephthalate mat as described above having a weight of 0.75 ounce per square yard and saturated with the same thermosetting resin composition to the extent of 90 percent of the total weight of the impregnated mat was then laid against the first filament layer in a longitudinal direction to provide an intermediate layer (corresponding to layer 13 of FIG. 1). The low-adhesion carrier web by which the impregnated mat had been supported was then stripped away. Next, a second filament layer was applied to the exposed surface of the impregnated mat but at an opposing 60 degree angle to provide, after slitting to suitable widths and winding into roll form, a product as illustrated in FIG. 1 except having symmetrically disposed filaments. Total thickness was about 0.040 inch, exclusive of the low-adhesion carrier tape.

A number of one-inch wide strips of this tape product after removal of the low-adhesion carrier tape were cured in a heated platen press at contact pressure for 25 minutes at 330° F. Four specimens were cured while maintained at 37.5 percent elongation while four others were cured without stretching. The cured specimens were then tested for ultimate tensile strength in accordance with ASTM test D 638–52T using a Baldwin Universal Test Machine at a four inch test span. The unstretched strips showed an average tensile strength of 146 pounds per inch of width, an exceedingly high value for stretchable material of comparable thickness, whereas the stretched samples showed an average of 174 pounds. It follows that the novel stretchable tape should normally be applied in a stretched condition, with easing of application tension as required to conform the tape to the surface to which it is applied. Since a stretched tape has a smaller cross-sectional area, the increase in the strength of an actual cured structure realized in applying the tape while stretched is even greater than would appear from the numerical data.

The above described bi-directionally oriented, stretchable resinous tape has excellent handling qualities. In one-inch widths, it easily stretched with hand pulling to an elongation of 30–40 percent. Considerably increased tension increased the elongation to 50 percent, at which point the surface of the tape become rather wrinkled, a warning that the ultimate tensile strength was being neared. It was very difficult to further elongate the tape. Accordingly, the user can apply the tape with a sense of security that it will withstand considerable abuse without danger of breakage.

The tape has demonstrated commercial utility in a number of applications. It has been used to insulate electrical components of complex shape and in such use the kinking and wrinkling previously encountered in using non-stretchable reinforced resinous sheet was eliminated. When wrapped around a rotor coil and then heated to cure the resinous composition, a protective insulating layer was obtained which effectively constrained the coil in spite of exceedingly large centrifugal forces. The insulating layer possessed high electrical resistance and was characterized by excellent resistance to heat, moisture, lubricating oils and other common sources of failure of electrical insulation.

The conformability of the tape has been demonstrated by wrapping a common incandescent light bulb, after which the wrapped bulb was placed in an oven at 325° F. for 90 minutes. The resultant envelope was tough and completely free from wrinkling or other undesirable discontinuity. A pyrex glass pipe tee, when wrapped with the tape and then heated to cure the resin, was found to have considerably enhanced strength and resistance to breakage. The tough, monolithic covering demonstrated the utility of the novel tape as a means for easily and economically fashioning compound shapes of reinforced resin, particularly fittings for high-pressure reinforced resinous pipe. It should be understood that the form on which the novel bi-directionally reinforced tape is laid up may either be removed after curing or become a part of the final product, according to the needs of the particular application.

Example II

To test the importance to the handling characteristics of the stretchable tape of Example I imparted by the resin-filled polyethylene terephthalate mat as the intermediate, stress-absorbing layer, a number of identical tapes were prepared except in respect to the intermediate layer. One was provided with a non-reinforced intermediate layer of the thermosetting resin composition of 0.020 inch thickness, i.e., approximately the weight and thickness of the layer of resin-saturated mat in the tape of Example I. Another test tape was provided with an intermediate resin layer of 0.010 inch thickness. In a third comparative tape, the intermediate layer was omitted.

When one-inch wide specimens of these tapes were tested in the uncured state for ultimate tensile strength using the Scott Incline Tensile Tester at a four inch span and with a 10,000 gram load, the following data was obtained:

| Intermediate Layer | Saturated Mat | 0.020 inch of resin | 0.010 inch of resin | None |
|---|---|---|---|---|
| Tensile strength (pounds) | 10.5 | 4.1 | 3.6 | 1.9 |
| Elongation (percent) | 68 | 125 | 108 | 32 |

While the polyester mat lessens the stretchability of the tape, it substantially improves its handleability and is preferred for that reason, since the elongation is still entirely adequate for envisioned purposes. The tapes having non-reinforced resinous interlayers had good handling properties and gave adequate warning of possible breakage by markedly increased tensile strength near the break point.

Example III

Another stretchable tape was prepared which was identical to that of Example I in every respect except that each layer of filaments was oriented at 45 degrees to the longitudinal direction of the tape. When tested as described in Example II, this tape showed an ultimate tensile strength of 9.7 pounds for an inch wide specimen and an elongation at break of 53 percent. This tape had good handleability and could be applied easily in a highly stretched condition without danger of breakage.

*Example IV*

Reinforced resinous sheet material was prepared as in Example I except using different glass and resin. Used as the glass were 100 ends per inch of 140's glass roving, vinyl silane size. The resin composition consisted essentially of a semi-solid polyglycidyl either of phenol-formaldehyde novolak having about 3.5 oxirane groups per average molecular weight; polycarboxylic acid anhydride; and 325-mesh mica powder in an amount of 17% of the total weight of the composition. This sheet material comprised 55% glass by weight and 45% resin, including filler.

A bi-directionally reinforced tape was made up of two plies of this sheet material laid directly together and against a silicone-treated kraft paper liner with the filaments of each layer extending 45 degrees to the longitudinal. The kraft paper liner was then moved in contact with metal which had been preheated to 190° C. and as it reached the metal, there was pressed against the exposed filament layer a 0.5 mil film of heat-shrinkable oriented polyethylene terephthalate. Two minutes contact with the metal was sufficient to B-stage the resin composition and to adhere the oriented film to the filament layer. Upon cooling to room temperature, the resin surface was tack-free and the liner was removed, with the laminated product being wound upon itself for storage. Caliper thickness was about 12 mils. The oriented film by itself had about 15% longitudinal shrinkage and 0–2% crosswise growth when exposed in air at 150° C. for 5 minutes.

A ¾ inch wide tape, slit from the laminated product with filaments oriented oppositely at 45 degrees, broke under a force of 12.6 pounds at an elongation of 28½% using the Scott Incline Tensile Tester at a 10 inch span and with a 10,000 gram load. This tape was wound under tension, half lapped, oriented film outward, on a metal bar of ½ by ¾ inch cross-section. Shrinkage of the oriented film produced a smooth, tight insulating surface upon curing at 175° C. in air for 2 hours. The insulation broke down at 9000 volts, 60 cycles, the thickness being 16 mils at the point of breakdown.

This tape has demonstrated utility as electrical insulation for stator coils and exhibits excellent cut-through resistance in such use. Essentially equivalent utility is achieved using a thinner surface film, e.g., ¼-mil oriented polyethylene terephthalate film, and such thinner film is normally preferred since tapes made therewith are more readily stretchable.

Bi-directionally reinforced resinous tape of this invention has been used to form cylindrical and conical structures by winding on a mandrel (starting at a shoulder) such that the plane of the tape is at an angle to the mandrel surface and only the edge of the tape touches the mandrel. In such use, the novel tape and individual aligned-filament layers thereof are preferably relatively thick in order to complete the wrapping of the mandrel within a reasonable period of time. The resultant structure upon curing is tough and monolithic, with filament reinforcement extending through the thickness dimension at all points. By way of example, the use of ½ inch wide tape at an angle of 20° to the mandrel provides a rigid structure, since the resin impregnant when cured has a modulus in tension of at least 50,000 p.s.i., as do the resin compositions of each of the foregoing examples.

Many variations in materials and manner of construction as well as useful applications will occur to those skilled in the art when apprised of the teachings of this invention.

What is claimed is:

1. Thin, strong, conformable, splice-free, filament-reinforced resinous tape about ⅜–3 inches in width and at least 100 feet in length comprising at least two coterminous layers, each of which consists of flexible, high-strength, non-woven, aligned, essentially contiguous glass filaments which are uniformly distributed within the layer and are saturated and unified by a deformable uncured thermosetting resin composition which when cured has a modulus in tension of at least 50,000 p.s.i., each of said layers having a thickness of 4 to 20 mils, said filaments extending obliquely and oppositely and essentially at only two angles, each of said angles being 30 to 60 degrees to the longitudinal direction of the tape, the filaments of one of said layers extending at one of said angles and the filaments of another of said layers extending at the other of said angles, said filaments comprising 40 to 80% by weight of each of said layers, and where the filaments comprise more than 65% by weight of said layers said resinous tape has a stress-absorbing thermosetting resin layer having a uniform thickness of 1 to 20 mils interposed between adjacent layers of resin-saturated aligned filaments, said resinous tape being readily stretchable by hand pulling to an elongation of at least about 30 percent of its original length.

2. A bi-directionally reinforced resinous tape as defined in claim 1 and including as an additional layer a thin, extensible mat of randomly intermingled fibers, said mat having relatively low tensile strength when elongated more than about 30 percent.

3. A bi-directionally reinforced resinous tape as defined in claim 1 and further including as an additional layer a non-woven fabric of randomly intermingled polyethylene terephthalate fibers.

4. A bi-directionally reinforced resinous tape as defined in claim 1 and including as an additional layer a thin, extensible, self-sustaining film having relatively low tensile strength when elongated more than about 30 percent.

5. A bi-directionally reinforced resinous tape as defined in claim 1 and having firmly adhered to one surface an oriented polyethylene terephthalate film of about ¼ to ½ mil in thickness.

6. Thin, strong, conformable, splice-free, filament-reinforced resinous tape about ⅜–3 inches in width and at least 100 feet in length comprising (1) two coterminous layers, each of which consists of flexible, high-strength, non-woven, aligned, essentially contiguous glass filaments which are uniformly distributed within the layer and are saturated and unified by a deformable, uncured, room-temperature stable, thermosetting resin composition which when cured has a modulus in tension of at least 50,000 p.s.i., each of said layers having a thickness of 4 to 20 mils, said filaments extending obliquely and oppositely and essentially at only two angles, each of said angles being 30 to 60 degrees to the longitudinal direction of the tape, the filaments of one of said layers extending at one of said angles and the filaments of the other of said layers extending at the other of said angles, which filaments comprise 40 to 80% by weight of each of said layers, and (2) a stress-absorbing layer of said thermosetting resin composition having a uniform thickness of 1 to 20 mils interposed between adjacent layers of aligned filaments, said resinous tape being readily stretchable by hand pulling to an elongation of at least about 30 percent of its original length.

7. A bi-directionally reinforced resinous tape as defined in claim 6 wherein said stress-absorbing layer includes a thin, extensible mat of strong, randomly intermingled non-hygroscopic fibers.

8. Thin, strong, conformable, splice-free, filament-reinforced resinous tape about ⅜–3 inches in width and at least 100 feet in length comprising (1) two coterminous layers, each of which consists of flexible, high-strength, non-woven, aligned, essentially contiguous, continuous glass filaments which are uniformly distributed within the layer and are saturated and unified by a deformable, uncured, room-temperature stable, thermosetting resin composition which when cured has a modulus in tension of at least 50,000 p.s.i., each of said layers having a thickness of 5 to 10 mils, said filaments extending obliquely and oppositely and essentially at only two angles, each of said angles being 30 to 60 degrees to the longitudinal direction of the tape, the filaments of one of said layers extending at one of said angles and the filaments of the other of said layers extending at the other of said angles, each of which layers comprises about 50 to 65% glass filaments by weight, and (2) a stress-absorbing layer interposed between adjacent layers of aligned filaments and comprising a non-woven mat of randomly intermingled drawn and undrawn polyethylene terephthalate fibers, the undrawn fibers being fused together at their crossing points and the drawn fibers being substantially free from fusing with other fibers, said resinous tape being stretchable by hand pulling to an elongation of at least about 30 percent of its original length.

9. Thin, strong, conformable, splice-free, filament-reinforced resinous tape about ⅜–3 inches in width and at least 100 feet in length consisting essentially of four coterminous layers wound in convolute form on a single core, a consecutive two of which layers consist of flexible, high-strength, non-woven, aligned, essentially contiguous, continuous glass filaments which are uniformly distributed within the layer and are saturated and unified by a deformable, normally tacky, uncured thermosetting resin composition which when cured has a modulus in tension of at least 50,000 p.s.i., each of said layers having a thickness of 4 to 20 mils, said filaments extending in each of said two layers at an angle of not more than about 60 degrees to the longitudinal direction of the tape and oppositely to the angle of filaments of the other of said two consecutive layers, the other two of said four layers consisting essentially of non-impregnated, non-woven mat of randomly intermingled drawn and undrawn polyethylene terephthalate fibers, the undrawn fibers of each layer of mat being fused together at their crossing points and at least at some crossing points with undrawn fibers of the other layer of mat to effect a superficial bonding between said two layers of mat, and the drawn fibers of the mat layers being substantially free from fusing with other fibers, so that on unwinding the four layers preferentially divide between the two mat layers to provide a continuous tape structure surfaced on each side of said two layers of aligned filaments by one of said layers of mat, said continuous tape structure being stretchable by hand pulling to an elongation of at least about 30 percent of its original length, said layers of lineally-aligned filaments including sufficient resin that when the tape structure is heat-cured after being applied under tension, the resin flows into the mat layers to provide a monolithic cured structure.

References Cited by the Examiner
UNITED STATES PATENTS

| | | | |
|---|---|---|---|
| 1,571,597 | 2/26 | Duryea | 154—52 |
| 2,410,884 | 11/46 | Lawrence | 154—46 |
| 2,534,617 | 12/50 | Mohrman. | |
| 2,609,320 | 9/52 | Modigliani. | |
| 2,705,692 | 4/55 | Patterson | 154—46 |
| 2,746,696 | 5/56 | Tierney | 154—53.5 |

EARL M. BERGERT, *Primary Examiner.*